June 14, 1932. E. ENGBLOM 1,862,742
SMELTING OF METALLIFEROUS MATERIAL
Filed Dec. 18, 1929
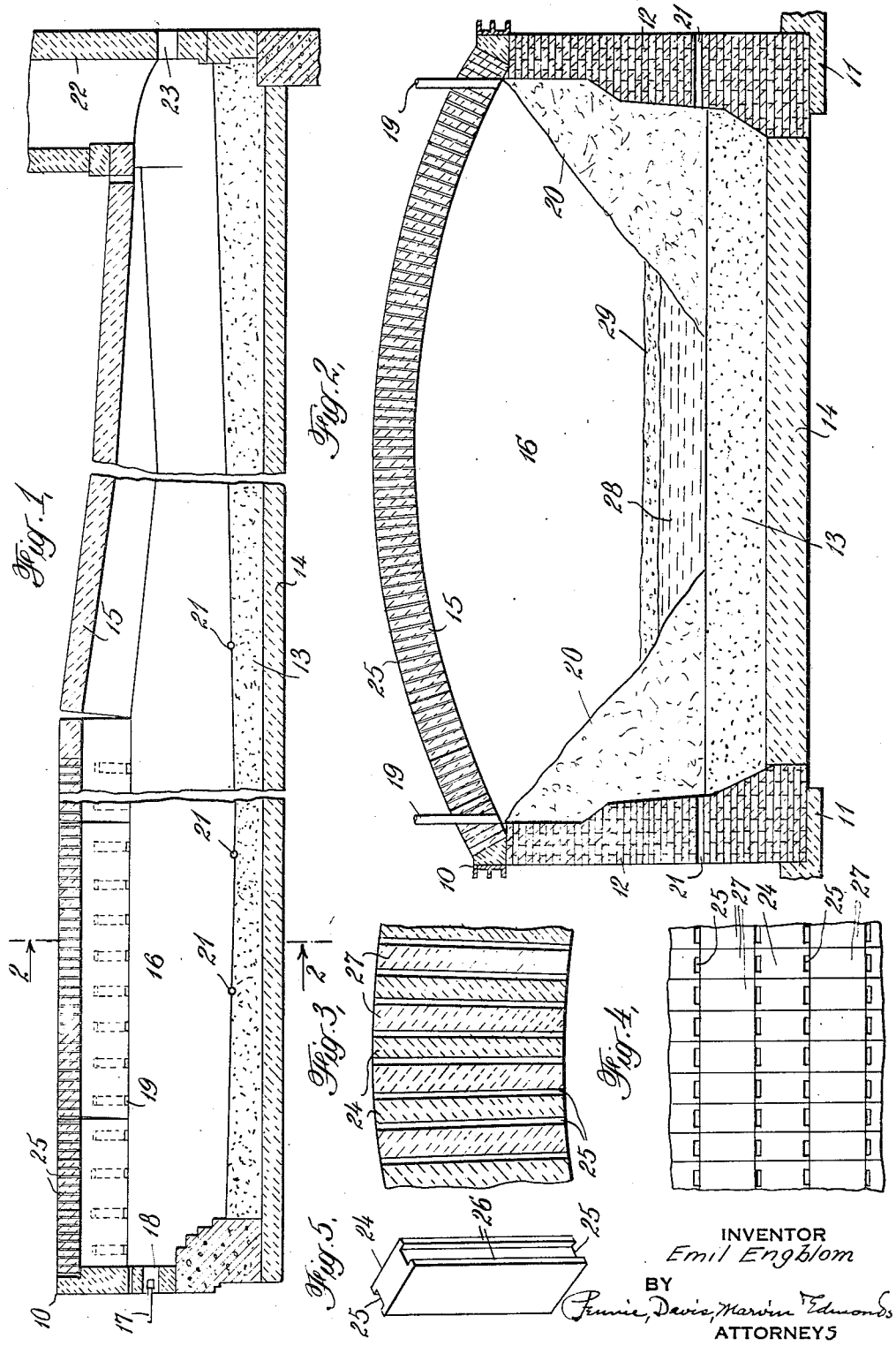
INVENTOR
Emil Engblom
BY
ATTORNEYS Patented June 14, 1932

1,862,742

UNITED STATES PATENT OFFICE

EMIL ENGBLOM, OF CALETONES, CHILE, ASSIGNOR TO BRADEN COPPER COMPANY, OF NEW YORK, N. Y., A CORPORATION OF MAINE

SMELTING OF METALLIFEROUS MATERIAL

Application filed December 18, 1929. Serial No. 415,042.

This invention relates to the smelting of metalliferous material and has for its object certain improvements in the apparatus for smelting metalliferous material. The invention relates more particularly to smelting operations conducted in reverberatory furnaces.

Numerous advances in metallurgical processes and furnaces have been made in recent years. This is particularly true in the reverberatory smelting of ores, such as evidenced in the copper industry. In the smelting of coarse copper ores, for example, in reverberatory furnaces, instead of employing a relatively long flame under the furnace arch as was once the practice, a comparatively short hot reduction zone has been adopted, which is accompanied by a considerable increase in the rate of consumption of fuel. The temperature of the reduction zone has been increased several hundred degrees above that formerly employed. This increase in the intensity of firing permits an increase in the rate of charging metalliferous material to be treated. The increase in capacity of a given sized furnace results in an increased amount of charge smelted per unit of fuel consumed. This tendency toward more intense firing for a shorter reduction zone has given larger capacities and better fuel ratios. The shorter and hotter zones also tend effectively to diminish the chilling effect normally resulting when fresh relatively cold charges are added to a furnace. While hearth dimensions have been kept practically constant, smelting capacities have increased three to four times, and the fuel ratios have been only doubled. A shorter and hotter reduction zone, in other words, gives a larger ore-treatment capacity without a corresponding increase in fuel consumption.

The use of a relatively short hot smelting zone is an economical way of operating a reverberatory furnace. A given charge may be most efficiently subjected to the reduction operation in this manner, and a new charge may be supplied promptly to the furnace for treatment. In fact, the use of such a hot zone lends itself most effectively to a continuous smelting operation. An even hotter zone than is at present employed is desirable, because charges of metalliferous materials could be treated more quickly and in larger amounts. While the operating temperature of the smelting zone of a reverberatory furnace may be readily increased by suitable adjustments in the amounts of fuel employed, the temperature of the zone is in the last analysis primarily limited by the capacity of the furnace linings to withstand the prevailing temperatures under normal operating conditions. Even at the temperatures now employed, the linings of the furnaces tend quickly to corrode and frequently to disintegrate. This is particularly true of the furnace arches, and frequent shut-downs for repairs are necessary. Such shut-downs are, of course, costly because of the labor and materials required to effect the necessary repairs and also because of the time lost in the smelting of further amounts of metalliferous material.

It is the general practice to construct reverberatory furnaces with a silica bottom, silica or magnesite brick sides, or a combination thereof, and an arched roof composed of silica bricks. The furnace bottom is ordinarily not exposed to corrosion, and lasts for an indefinite period. The same is true of the side walls of the furnace when, as is almost universally the case, the furnace is charged with metalliferous material from the side. That is to say, in side-charging, the metalliferous material is banked up against the side walls, and thus offers a protection against high temperatures and corrosion. The roof, however, especially in the case of the use of a relatively hot and short smelting zone, is directly exposed to the most intense heat.

It is also universal practice to seal the furnace as far as possible against the entrance or seepage of outside air, in order to keep out oxidizing influences. When the furnace linings are highly heated in the presence of oxygen, they tend rapidly to deteriorate. Various mixtures of lime, clay, grout, sodium silicate and silica are generally used as mortar between the bricks or as a wash that is swept over the top of the roof so that it may lodge in the cracks between the brick, and thus seal the interior of the furnace against the entrance of outside air. Special precautions are taken generally to prevent the opening up of the cracks between the brick by the warping of the roof. Thus, to prevent cracks between the brick by warping of the roof, the steel plate supporting skewback is sometimes made continuous. That is, it is not riveted to the I-beams that take, together with their tie rods, the thrust of the arch. The roof section over the hottest zone is replaced approximately seven times, for example, more often than the section of the arched roof over the slag bay.

The capacity of the furnace linings to withstand corrosion and disintegration is in large part influenced by the nature of the charge employed in the smelting operation. Modern metallurgical practice tends to finer and finer grinding of the ore. The finely divided charge employed at present smelts more easily than one containing coarse crude ore and jig concentrates. A smaller particle sized charge exposes more surface area to the highly heated reduction gases, and the slag forming constituents added to the charge are more intimately admixed. The tendency is, therefore, toward finer grinding of the ore employed, in an endeavor to free the finely disseminated mineral particles from gangue constituents, and to make the composition of the concentrates finally employed in the smelting operation approach as closely as possible that of the metal to be recovered. The concentrates are by nature essentially basic. If recovered as sulfides, they are invariably roasted to form oxides of their metals. Froth flotation processes are now so highly developed that substantially all of the ores, particularly copper ores, are concentrated in this manner. As is well known, froth flotation appears to reach its highest efficiency in alkaline circuits. Such concentrates as are thus subjected to smelting operations in reverberatory furnaces are generally basic.

The finer the metal-bearing ore is ground, the finer are the concentrates charged to a smelting furnace. This gives rise to considerable dusting. That is to say, as the highly heated reduction gases are swept over the concentrates charged to a reverberatory furnace, their velocity is such as to lift a multitude of dust particles of the charge into the open space above, and in contact with the furnace linings, particularly with the roof. These basic dust particles tend promptly to flux with the acidic furnace linings at the prevailing temperatures. The higher the temperature employed, the more readily the dust particles fuse with the silica linings.

Whenever oxygen and dust particles of the charge get together at highly elevated temperatures in the presence of the silica brick employed in the lining of the furnace, the brick are promptly corroded and tend rapidly to disintegrate. In the presence of silica and excess sulfides, such as iron sulfide, the iron sulfide is probably oxidized to FeO in which form it attacks the silica brick and slags as $x\text{FeO}.y\text{SiO}_2$. The composition of the slag is a function not only of the content of the interacting solids, but also of the prevailing temperature employed. Other basic oxides, like copper oxides, are also present in the corroded or slagged silica brick. The higher the temperature employed in the firing zone, the less amounts of basic oxides are required to flux the silica brick sufficiently to cause them to drip. The slagging action of the dust, raised from the concentrates, on the silica brick is greatly accelerated by an increase in operating temperatures. This acceleration is even more than is to be expected from the increase in the speed of reaction.

As smelting operations are continued, the corrosion and disintegration of the furnace linings continue to progress. The slag penetration into the bricks is no doubt due in part to the capillary action of the pore spaces in the brick, which tends to draw up the fusible silicates. The slag enters into the silica brick to a distance determined by its fluidity, which is in turn governed by the prevailing smelting temperatures. As fresh basic dust is brought up into contact with the silica roof, the silica content of the exposed brick becomes sufficiently lowered for the bottom part of the brick to become fusible, and slag drips are formed and tend to drop into the furnace.

My investigations have led to an apparatus adapted for the employment of the relatively short, hot flames, preferred, for example, in reverberatory practice, whereby furnace linings can be made considerably longer-lived, and by which in fact smelting temperatures can be raised with less corrosion and less disintegration of the furnace linings. Still finer particle size concentrates may be freely used as the charge material. Smelting operations may be conducted while keeping the basic dust particles from the charge substantially out of contact with the furnace linings. The furnace linings, particularly the arch, is substantially cooled from the interior and may be kept at a temperature substantially lower than that employed for the reduction proper. These desirable features may moreover, be obtained by a lower consumption of fuel.

The present invention contemplates a metallurgical furnace of the reverberatory type adapted to provide a layer of protecting gas along the inner face of the furnace linings normally exposed to the furnace gases during smelting operations.

These and other features of the present invention will, it is believed, be better understood by reference to the accompanying drawing, taken in conjunction with the following description, in which:

Fig. 1 is a side elevation in section of a reverberatory furnace adapted for the practice of the invention;

Fig. 2 is an end elevation in section on the line 2—2 of Fig. 1;

Fig. 3 is an end elevation in section of a portion of the arched roof shown in Figs. 1 and 2;

Fig. 4 is a plan view of a portion of the arched roof shown in Figs. 1 and 2; and Fig. 5 is a perspective view of a single brick taken from the arched roof, illustrating the manner in which slots are provided in the side faces of the same.

Referring more particularly to Fig. 2, a reverberatory furnace 10 is shown resting on concrete foundations 11. The furnace itself consists of side walls 12 constructed of silica or magnesite brick, or a combination thereof. A fused silica bottom 13 extends throughout the entire length and breadth of the furnace proper, and is supported on a firebrick foundation 14. An arched roof 15 constructed of silica brick, rests on the side walls, with which it defines a main firing and smelting chamber 16.

Referring more particularly to Fig. 1, a burner 17 is located in an opening 18 at the firing end of the furnace. A plurality of such burners, preferably in lateral alignment, are used during smelting operations. They are adapted for the burning of any fuel desired, such as oil, pulverized coal, gas, etc.

A plurality of side feeding ports 19, regularly spaced, are provided through the arched roof and along the side walls of the furnace. They are adapted for the introduction into the furnace of metalliferous material 20 (see Fig. 2) to be smelted. It will be observed that the material so fed banks up against the side walls, and protects the same against high temperatures and corrosive influences.

A plurality of spaced tap holes 21 are provided through the side walls, at practically the same level as the silica bottom of the furnace. These holes are adapted for the periodic withdrawal of molten metal. The opposite end of the furnace is provided with a stack or chimney 22 for the withdrawal of combustion and furnace gases. A suitably disposed port 23 is located in this end of the furnace for the periodic withdrawal of the slag.

Figs. 3, 4 and 5 give certain detailed views of arch brick employed over the firing and smelting zone, where highest smelting temperatures are employed. Silica brick 24 have slots 25 provided along their side faces 26, adapted for the passage of air (see Fig. 5). When the bricks are placed in position, as more particularly shown in Fig. 4, it will be seen that a layer of slotted brick may advantageously be disposed between layers of un-slotted brick 27. In this manner, a plurality of slots or ports are provided in the roof of the furnace most economically.

Certain dimensions may be useful in a consideration of the invention as I have practiced it. A reverberatory furnace was employed having an overall length of 123 feet 6 inches and a width of 29 feet. The silica brick in the arched roof measured 20″ x 6″ x 3″ x 3″. Slots were cut into alternate layers of the brick, on both sides. They were ½″ x 2″ x 20″. The side of the brick containing the slot was fitted against the face of an unslotted brick.

The metallurgical furnace illustrated and described above may be operated as follows in the practice of the invention.

Suitable amounts of the metalliferous material 20, such as copper ore, are introduced through the side charging ports 19. This charging is preferably conducted from both sides of the furnace. Suitable fuel, such as oil under pressure, is fed to the burner 17. The oxygen required for combustion may be made to contact with the escaping oil either as air filtering through the opening 18, or a suitable mixture of air and oil may be passed through the burner proper. As the fuel is burned, a flame passes through the chamber 16, preferably sweeping over the banked metalliferous material 20. As reduction of the metallic compounds present in the charge takes place, the molten metal 28 sinks to the bottom of the chamber, while a slag 29 collects on the surface. The combustion and furnace gases eventually pass up the stack or chimney 22 to the outside atmosphere. When it is desired to withdraw molten metal, the top holes 21 are opened and molten metal is withdrawn. Slag is periodically withdrawn from the chamber through the port 23.

The usual practice in the operation of this type of reverberatory furnace has just been described. The steps characteristic of the present invention will now be described.

As the combustion gases pass from the burner 17 to the stack 22, they set up a suction draft, that is adapted to cause the infiltration of air through the plurality of slots 25 provided in the arched roof. The net result is to cause the introduction of a plurality of streams of moving air into the firing and smelting chamber 16. The air so introduced moves along the inner face of the roof in the form of a layer, and toward the stack 22. It will thus be seen that this layer of air in a sense acts like a buffer between the furnace arch, on the one hand, and the combustion gases, on the other hand.

The layer of air so disposed along the inner face of the arched roof offers a number of highly desirable advantages. In the first place, the temperature of the outside air introduced through the slots is substantially cooler than the combustion gases supplied to the reduction step. This relatively cool air serves to cool the roof brick as it passes through the slots 25, and also as it passes along the inner face of the roof. Since high temperatures of themselves tend to cause the failure of such brick, it is seen that this cooling effect constitutes a very important preservation for the brick.

In the second place, the layer of air so disposed along the inner face of the roof tends to keep the brick out of contact with dust particles rising from the charge. As the combustion gases sweep from the burner 17 over the heaped metalliferous metal 20, they tend to lift up a multitude of dust particles. Under normal operating conditions, many of these dust particles would be promptly carried up against the walls of the roof. The layer of moving air provided along the inner face of the walls of the roof, however, serves to keep both the combustion gases and the dust particles out of contact with the walls. In fact, this moving layer of air has a tendency to force the moving combustion gases and dust particles downwardly toward the charge material and the bath of molten metal and slag. Since the lining of the furnace, particularly the roof, is principally impaired because of the chemical reaction that takes place between the basic dust particles and the acidic roof brick at the temperatures normally required for smelting, it is seen that a very material protection is thus provided for the preservation of the furnace lining.

In the third place, the infiltration of air through the slots 25 serves to feed additional oxygen to unconsumed fuel reaching the main smelting zone. Since the smelting action on the ore to be treated is one of reduction, the fuel employed is so combusted as to make the heating gases reducing in character. Unconsumed fuel is therefore swept over the charge. Air seeping through the slots provides oxygen for the combustion at least in part of this unconsumed fuel. The net result is to burn fuel at a place where it is mostly needed; namely, directly over the metalliferous material itself. Except for this additional oxygen supplied in this manner, the unconsumed fuel would proceed to the stack and be lost. An important economy in fuel consumption is therefore provided in the practice of the invention, while at the same time intensifying combustion in the section of the furnace where hottest temperatures are most desired.

It is altogether possible, in the fourth place, that a change in behavior of the dust particles toward the silica brick takes place in the zone where the added air meets the combustion and furnaces gases. That is to say, the intensity of chemical reactivity of the dust particles may be lowered when they strike the layer of air disposed along the furnace linings. Such a change may, for example, be due to the drop in temperature not only of the dust particles but also of the furnace walls. In fact, the change may very well be due, in part at least, to a change in the chemical and physical characteristics of the dust particles themselves, before they contact with the silica brick. Thus, a higher state of oxidation of the dust particles than is normally the case may make them less reactive to the furnace linings. In that event corrosion and disintegration of the walls may not readily take place, even though some at least of the many dust particles contact with the furnace walls.

The foregoing comments may be illustrated by following the movement of a dust particle, such as a ferrous oxide (FeO), while the invention is being practiced. As the highly heated reducing gases are swept over the charge, a particle of FeO is lifted and carried toward the furnace roof, in a forward direction. At the same time, a layer of relatively cool air is moved along the inner face of the roof. It is highly oxidizing in character. The highly heated smelting gases form an under layer, and are highly reducing in character. When the highly heated reducing gases strike the layer of relatively cold oxidizing air, an exchange of heat promptly takes place. As a result of that interchange of heat, an oxidizing zone of a relatively high temperature is formed. It is thus seen that the dust particle of FeO may pass out of its reducing environment, before being subjected to reduction, into this hot oxidizing zone where it is changed to a higher oxide, such as ferric oxide ($Fe_2O_3$). The transformed dust particle may then pass through the relatively cool layer of air and strike the furnace walls with little or no chemical combination.

It is of course to be understood that the principles of the invention are not to be confined to any such explanation as I have here offered. For present purposes it should perhaps be sufficient to point out that a gaseous medium, such as air, is placed along the inner face of the furnace linings to make them longer-lived under smelting operations; and that a furnace may be constructed for that specific purpose.

While I have shown the use more specifically of slots in the furnace arch to provide for the infiltration of air, it must be apparent that other means may be provided for introducing the gaseous medium in an appropriate manner. Thus, for example, pipes may be employed as passageways for the gas. In fact, compressed air may with advantage be employed in the practice of the invention. The air may be introduced at various points and in various ways. It is also to be understood that gaseous mediums other than air may be employed. In fact, mixtures of various gases may be used.

In my copending application Serial No. 415,041 filed December 18, 1929 I have described and claimed a process for smelting metalliferous material in a reverberatory furnace such as that herein described.

I claim:

1. A metallurgical smelting furnace of the reverberatory type comprising a main firing and smelting chamber, an arch surmounting said chamber, said arch being provided with a plurality of slots extending therethrough and communicating freely with the outside atmosphere at their upper ends and with the inside of the chamber at their lower ends, said slots being adapted for the infiltration of outside air to the inside of the chamber.

2. A metallurgical smelting furnace of the reverberatory type comprising a smelting chamber, a silica roof surmounting said chamber, said roof being provided with ports extending completely therethrough adapted for the infiltration of free outside air into the chamber, said ports being so located as to provide for a layer of air along the inner face of the roof under normal operating conditions.

3. In a copper smelting furnace of the reverberatory type, the combination comprising a plurality of spaced slots extending completely through the arch surmounting the smelting chamber, said slots being exposed at their upper ends to the open atmosphere whereby outside air may freely seep through the slots into the chamber.

4. A copper smelting furnace according to claim 3, in which the arch over the smelting chamber is in large part constructed of slotted brick disposed between layers of unslotted brick.

5. A copper smelting furnace according to claim 3, in which the slots are provided throughout substantially the entire length of the arch over the smelting chamber.

In testimony whereof I affix my signature.

EMIL ENGBLOM.